(12) United States Patent
Kim et al.

(10) Patent No.: US 11,272,261 B2
(45) Date of Patent: Mar. 8, 2022

(54) CLOUD PLATFORM CAPABLE OF PROVIDING REAL-TIME STREAMING SERVICES FOR HETEROGENEOUS APPLICATIONS INCLUDING AR, VR, XR, AND MR IRRESPECTIVE OF SPECIFICATIONS OF HARDWARE OF USER

(71) Applicant: ONNETSYSTEMS KOREA INC., Seoul (KR)

(72) Inventors: Sungkyun Kim, Seoul (KR); Sung-hwan Lee, Sejong-si (KR)

(73) Assignee: ONNETSYSTEMS KOREA INC., Seoul (KR)

( * ) Notice: Subject to any disclaimer, the term of this patent is extended or adjusted under 35 U.S.C. 154(b) by 0 days.

(21) Appl. No.: 17/378,277

(22) Filed: Jul. 16, 2021

(65) Prior Publication Data
US 2021/0345011 A1  Nov. 4, 2021

Related U.S. Application Data

(63) Continuation of application No. PCT/KR2019/013050, filed on Oct. 4, 2019.

(30) Foreign Application Priority Data

May 31, 2019  (KR) ........................ 10-2019-0064436

(51) Int. Cl.
*H04N 21/81* (2011.01)
*G06T 1/20* (2006.01)
*G06T 9/00* (2006.01)
*G06T 19/00* (2011.01)

(52) U.S. Cl.
CPC ............. *H04N 21/816* (2013.01); *G06T 1/20* (2013.01); *G06T 9/00* (2013.01); *G06T 19/006* (2013.01); *G06T 2200/16* (2013.01)

(58) Field of Classification Search
CPC ........... H04N 21/816; G06T 1/20; G06T 9/00; G06T 19/006; G06T 2200/16
See application file for complete search history.

(56) References Cited

U.S. PATENT DOCUMENTS

| | | | |
|---|---|---|---|
| 2013/0083003 A1* | 4/2013 | Perez ...................... | A63F 13/79 345/419 |
| 2014/0243083 A1 | 8/2014 | Bae et al. | |
| 2016/0328827 A1* | 11/2016 | Ilic ....................... | H04N 5/2624 |

FOREIGN PATENT DOCUMENTS

| KR | 10-1179554 B1 | 9/2012 |
|---|---|---|
| KR | 10-1826498 B1 | 2/2018 |
| KR | 10-1867319 B1 | 6/2018 |
| KR | 10-1894955 B1 | 9/2018 |

* cited by examiner

*Primary Examiner* — Chong Wu
(74) *Attorney, Agent, or Firm* — Novick, Kim & Lee, PLLC; Jae Youn Kim

(57) ABSTRACT

Proposed is a cloud platform for realizing all 5G services including high-quality heterogeneous applications including augmented reality (AR), virtual reality (VR), extended reality (XR), and mixed reality (MR) or mobile content based on the cloud and providing real-time streaming of these services irrespective of specifications of hardware of users.

10 Claims, 4 Drawing Sheets

CLOUD PLATFORM CAPABLE OF PROVIDING REAL-TIME STREAMING SERVICES FOR HETEROGENEOUS APPLICATIONS INCLUDING AR, VR, XR, AND MR IRRESPECTIVE OF SPECIFICATIONS OF HARDWARE OF USER

CROSS-REFERENCE TO RELATED APPLICATIONS

This application is a continuation of PCT/KR2019/013050 filed Oct. 4, 2019, which claims priority to KR 10-2019-0064436, filed May 31, 2019, the entire disclosure of which is incorporated herein by reference.

TECHNICAL FIELD

The present invention relates to a cloud platform for realizing all 5G services including high-quality heterogeneous applications including augmented reality (AR), virtual reality (VR), extended reality (XR), and mixed reality (MR) or mobile content based on the cloud and providing real-time streaming of these services irrespective of specifications of hardware of users such that users can easily enjoy services without additional equipment and providers can remarkably reduce effects and costs required to launch developed applications, thereby facilitating popularization and generalization of AR, VR, XR, and MR applications or mobile content.

BACKGROUND ART

Recently, cloud based application program platforms have been popularized. For example, a platform user can access a cloud server through various devices in order to use a large file instead of downloading and installing the large file.

However, current platforms are limited to central processing unit (CPU)-intensive applications that do not meet requirements for graphics processing unit (GPU)-intensive applications, and thus the GPU-intensive applications cannot be accessed through cloud.

Accordingly, to access the GPU-intensive applications through the cloud in conventional technology, a specific hardware and OS (Windows, Linux, Android, or the like) environment needs to be created, causing difficulty generalizing and popularizing high-quality AR, VR, XR, and MR applications or mobile content.

Furthermore, users need to install applications in consideration of hardware specifications and operation environments such as OS for respective applications and have a lot of difficulty in additionally managing and using the applications after installation due to problems such as heating caused by operation processing of advanced applications and continuous update.

The present invention has been made in view of the above problems and provides an AR, VR, XR, and MR application user and provider-friendly AR cloud platform for allowing a user to easily use graphics-intensive or device-dependent AR, VR, XR, and MR application programs such as games through real-time streaming using an IPTV, a mobile device, a set-top box, and a PC of the user without upgrading or changing existing devices and allowing an AR, VR, XR, and MR application service provider to save costs required to launch applications and to considerably reduce a series of processes through which applications are provided to users to provide application services within a short time.

DISCLOSURE

Technical Problem

An object of the present invention is to provide a cloud platform for realizing graphics-intensive or device-dependent application programs such as games to which cutting-edge technologies such as NVidia CUDA, DirectX, OpenGL, Unity3D, Unreal, and OpenCL have been applied based on the cloud to allow a user to easily execute and operate heterogeneous applications including high-quality AR, VR, XR, and MR or mobile content through real-time streaming using an existing IPTV, mobile terminal, set-top box, and PC.

Furthermore, another object of the present invention is to provide a cloud platform for allowing service providers (Korea's mobile carriers such as KT, SKT, and LG Uplus, broadcasting companies, service providers that plan new services using new content, etc.) to construct a platform proposed by the present invention such that application developers can directly provide high-quality heterogeneous applications including VR, XR, and MR or mobile content to users through the platform to remarkably reduce efforts and costs required to individually launch applications or mobile content.

Technical Solution

In accordance with the present invention, the above and other objects can be accomplished by the provision of a cloud platform capable of providing a real-time streaming service for heterogeneous applications including AR, VR, XR, and MR irrespective of specifications of hardware of a user, the cloud platform including an image input unit configured to receive an image captured by a terminal of a user which is able to capture images, to process the received image through non-compression conversion, and to transmit the processed image to an application program unit, a controller configured to receive control event data input through a control terminal of the user, to analyze the control event data, and to transmit a driving control signal to the application program unit, the application program unit being configured to select and execute one of the heterogeneous applications including AR, VR, XR, and MR according to the control signal transmitted from the controller and to combine a virtual image realized by the application and the actual processed image transmitted from the image input unit to generate an image content, a result output unit configured to receive the image content generated through the application unit, to convert the image content through compression, and to stream the image content to a user's image terminal capable of reproducing images in real time through a streaming engine, and a data synchronization processor configured to synchronize the image input unit, the controller, and the result output unit with and the application program unit.

Advantageous Effects

The cloud platform capable of providing a real-time streaming service for heterogeneous applications including AR, VR, XR, and MR irrespective of specifications of hardware of a user according to the present invention has the following advantages.

Firstly, since high-quality heterogeneous applications including augmented reality (AR), virtual reality (VR), extended reality (XR), and mixed reality (MR) or mobile content are realized based on the cloud, service users can be easily provided with graphics processing unit (GPU)-intensive applications that have been executed only in specific hardware and OS (Windows, Linux, Android, etc.) environments through a real-time streaming service without upgrading or changing an existing IPTV, mobile terminal, set-top box, and a PC, and service providers (Korea's mobile carriers such as KT, SKT, and LG Uplus, broadcasting companies, service providers that plan new services using new content, etc.) can construct a platform according to the present invention and directly provide high-quality AR, VR, XR, and MR applications or mobile content to users through the platform to reduce costs required to individually launch applications and remarkably decrease the number of related procedures, accomplishing popularization and generalization of services.

Secondly, various heterogeneous programs including AR, VR, XR, and MR can be integrated and provided using a single platform through a real-time streaming service.

Thirdly, a user can easily execute and operate high-quality AR, VR, XR, and MR applications or mobile content without installing each application in consideration of hardware specifications and an operation environment such as an OS, and a heating problem is not generated in a user terminal because applications with advanced specifications are executed based on the cloud, maximizing convenience of use.

BEST MODE

Figure 1:
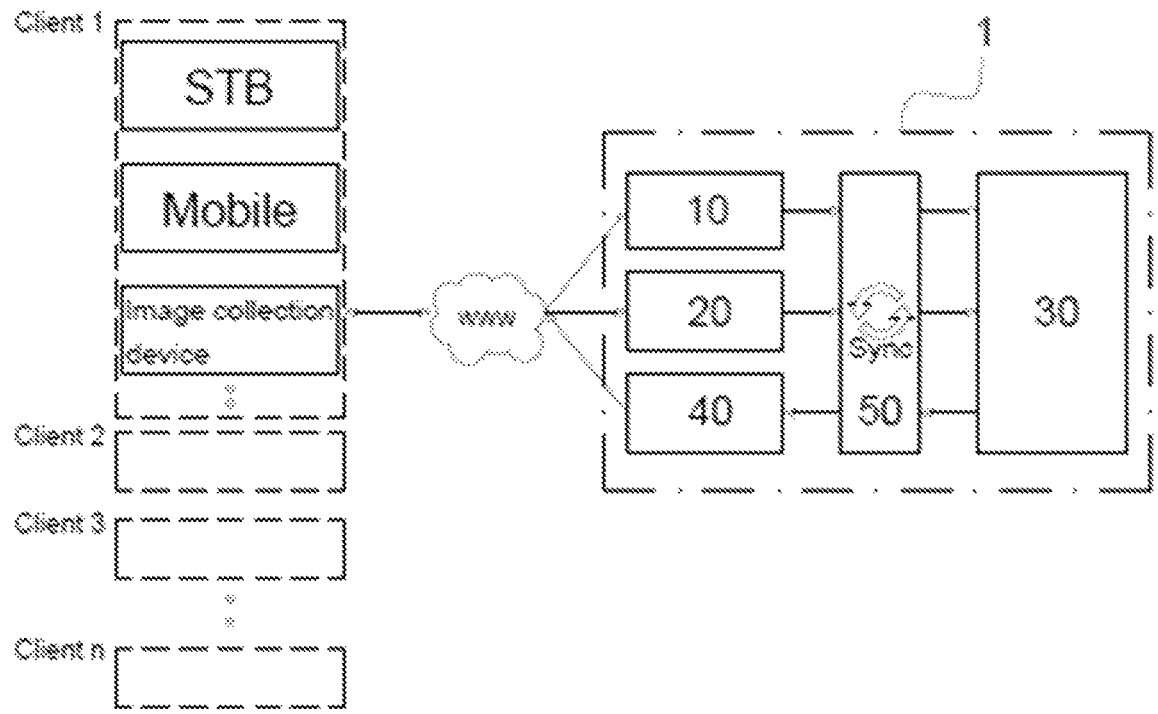
FIG. 1 is a configuration diagram of a cloud platform according to the present invention.

A cloud platform capable of providing a real-time streaming service for heterogeneous applications including AR, VR, XR, and MR irrespective of specifications of hardware of a user includes an image input unit 10 configured to receive an image captured by a terminal of a user which is able to capture images, to process the received image through non-compression conversion, and to transmit the processed image to an application program unit, a controller 20 configured to receive control event data input through a control terminal of the user, to analyze the control event data, and to transmit a driving control signal to the application program unit, the application program unit 30 being configured to select and execute one of the heterogeneous applications including AR, VR, XR, and MR according to the control signal transmitted from the controller 20 and to combine a virtual image realized by the application and the actual processed image transmitted from the image input unit 10 to generate an image content, a result output unit 40 configured to receive the image content generated through the application unit 30, to convert the image content through compression, and to stream the image content to a user's image terminal capable of reproducing images in real time through a streaming engine, and a data synchronization processor 50 configured to synchronize the image input unit 10, the controller 20, and the result output unit 40 with the application program unit 30.

MODE FOR INVENTION

A cloud platform capable of providing a real-time streaming service for heterogeneous applications including AR, VR, XR, and MR irrespective of specifications of hardware of a user according to the present invention will be described with reference to the attached drawings.

Figure 6:
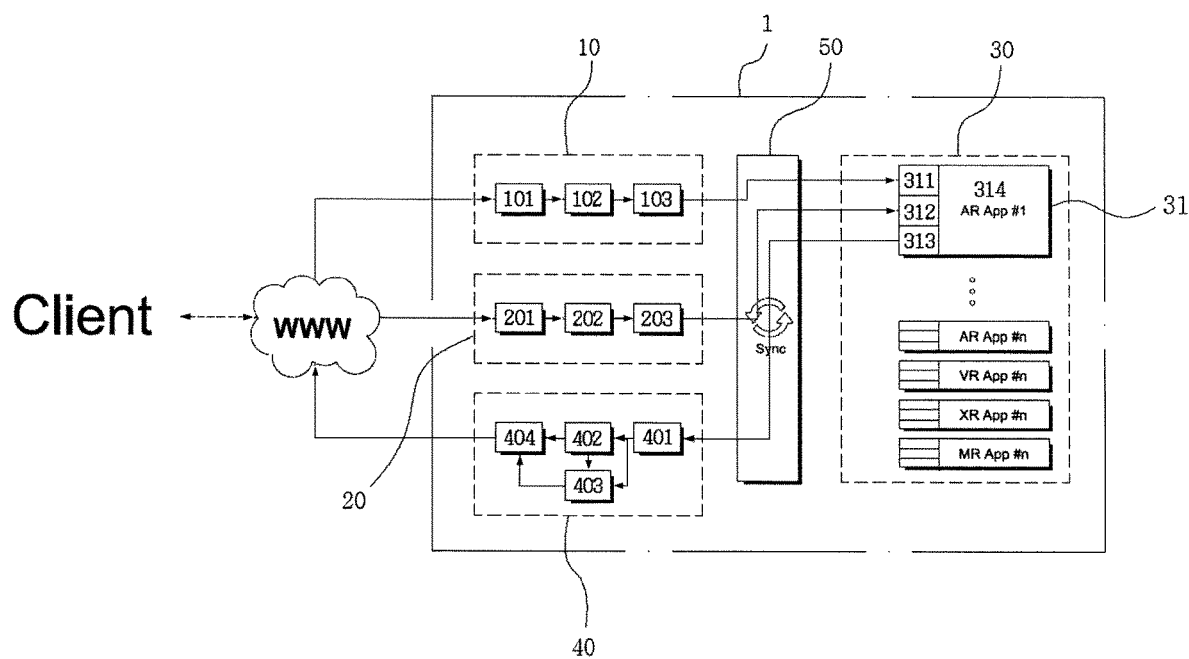
FIG. 6 is a configuration diagram illustrating an operation flow of the cloud platform according to the present invention.

As illustrated in FIG. 1 and FIG. 6, a cloud platform 1 according to the present invention includes an image input unit 10 configured to receive an image captured by a terminal of a user which is able to capture images, to process the image through non-compression conversion, and to transmit the processed image to an application program unit, a controller 20 configured to receive control event data input through a control terminal of the user, to analyze the control event data, and to transmit a driving control signal to the application program unit, the application program unit 30 being configured to select and execute one of the heterogeneous applications including AR, VR, XR, and MR according to the control signal transmitted from the controller 20 and to combine a virtual image realized by the application and the actual processed image transmitted from the image input unit 10 to generate an image content, a result output unit 40 configured to receive the image content generated through the application unit 30, to convert the image content through compression, and to stream the image content to a user's image terminal capable of reproducing images in real time through a streaming engine, and a data synchronization processor 50 configured to synchronize the image input unit 10, the controller 20, and the result output unit 40 with the application program unit 30.

The cloud platform 1 of the present invention including the aforementioned configuration may combine graphics-intensive AR, VR, XR, and MR application content that requires specific hardware and OS environment, such as games, and a real-time image captured by a user to generate image content irrespective of specifications of hardware of the user and stream a resultant image through a user terminal, such as an IPTV, a mobile terminal, a set-top box (STB), or a PC, in real time.

The user may easily control applications using external input devices such as a joystick, a keyboard, a mouse, a remote controller, or a gesture.

The cloud platform 1 having such a function is applicable to various fields such as a graphics-intensive game content field, an education content field, a print media content field, a web content field, and a mobile content field.

For example, in the case of the game content field, content directly created by a user may be converted into realistic 3D content and inserted into a game image based on the cloud, or a user action may be recognized and a game may be played according to the user action in a game scene based on the cloud according to the cloud platform 1 of the present invention.

In the case of the print media content field, print media such as magazines and books and AR may be combined to overcome flat and unilateral characteristics and to extend the print media concept.

In the case of an advertisement content field, advertisement related characters and graphics may be combined with the real world and displayed to provide more realistic advertisements to users.

Hereinafter, components constituting the cloud platform 1 will be described.

1. Image Input Unit 10

The image input unit 10 receives an image captured through a terminal of a user, processes the image through non-compression conversion and transmits the processed image to the application program unit.

Figure 2:
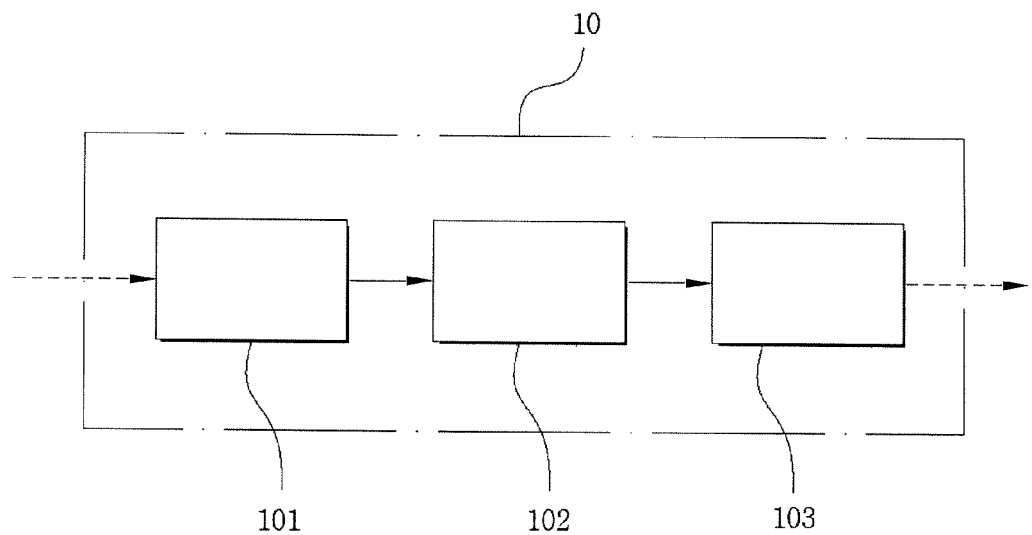
FIG. 2 is a configuration of an image input unit constituting the cloud platform according to the present invention.

As illustrated in FIG. 1, FIG. 2, and FIG. 6, the image input unit 10 includes an AV receiver 101 that receives an image captured by a terminal of a user which can capture images in real time, an AV non-compression converter 102 that converts the image received through the AV receiver 101 according to non-compression conversion, and a transmitter 103 that transmits the image converted through the AV non-compression converter 102 to the application program unit through the data synchronization processor.

Examples of the user terminal used to transmit an image to the AV receiver 101 include a smartphone camera, a web camera, a VDSLR, a video camera, and 360VR equipment. The AV receiver 101 receives an image transmitted from the user terminal in real time, decodes the received image into video and audio data in real time through the AV non-compression converter 102, and transmits the video and audio data to the application program unit through the transmitter 103.

The AV non-compression converter 102 may perform rapid processing through GPU based parallel processing, and according to this configuration, an image captured by the user and input in real time may be combined with a virtual image of an application and displayed on a monitor of the user in real time.

In addition, since operation from combination of the image input by the user in real time and a virtual image of the application to final output of the combined image is performed within tens of milliseconds (ms) according to configurations of the AV non-compression converter 102 of the image input unit 10 and an AC compression converter 403 of the result output unit 40, real-time streaming of the image can be performed such that the user scarcely feels a time difference between the input image and the output image.

According to the cloud platform 1 including the aforementioned configuration, large-capacity images can also be processed in real time and thus the user can easily experience real-time streaming image content provided through the cloud platform 1 in a state in which there is no burden on a response speed.

2. Controller 20

Figure 3:
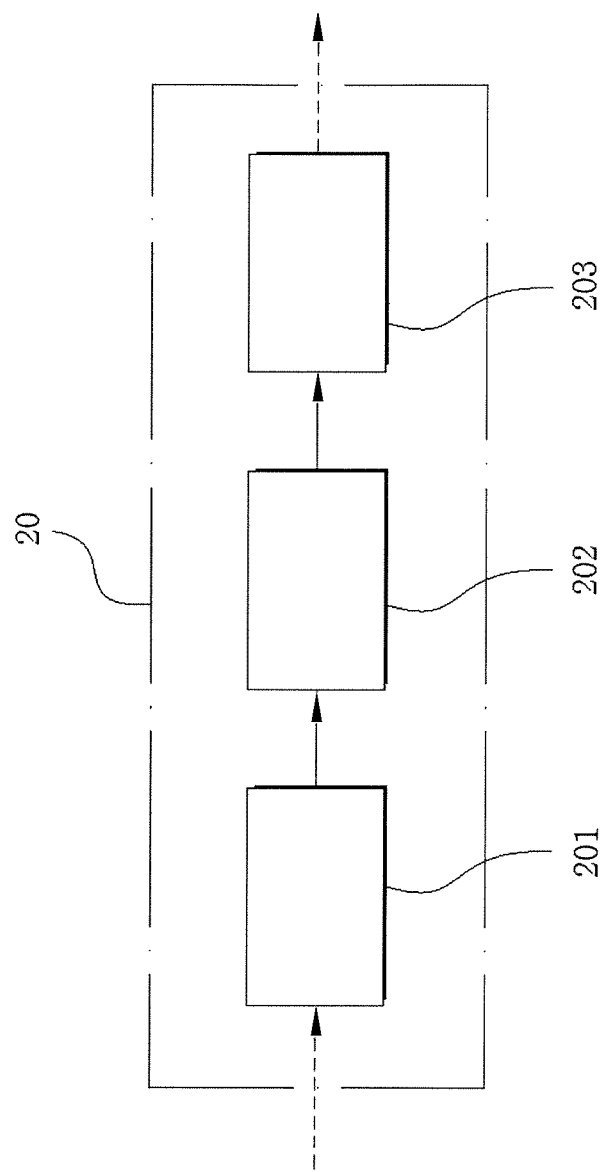
FIG. 3 is a configuration of a controller constituting the cloud platform according to the present invention.

The controller 20 receives control event data input through a control terminal of the user, analyzes the control event data, and transmits an application driving control signal. As illustrated in FIG. 1, FIG. 3, and FIG. 6, the controller 20 includes a control event receiver 201 that receives a control event input through the control terminal of the user, a data analyzer 202 that analyzes data of the control event received through the control event receiver 201, and a transmitter 203 that transmits data analyzed through the data analyzer 202 to the application program unit through the data synchronization processor.

Specific examples of the control terminal of the user which transmits a control event to the event receiver 201 include external input devices such as a joystick, a keyboard, a mouse, and a remote controller.

3. Application Program Unit 30

The application program unit 30 selects and executes one of the heterogeneous applications including AR, VR, XR, and MR according to the control signal transmitted from the controller 20 and combines a virtual image of the executed application and the actual image transmitted from the image input unit 10 to generate image content.

Figure 4:
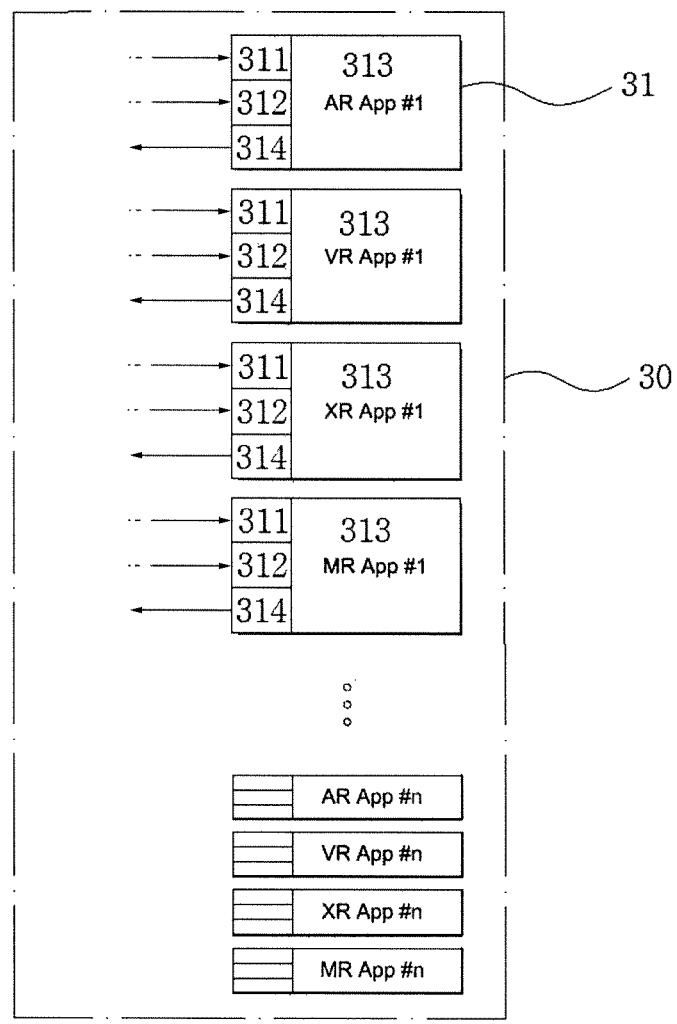
FIG. 4 is a configuration of an application program unit constituting the cloud platform according to the present invention.

As illustrated in FIG. 1, FIG. 4, and FIG. 6, the application program unit 30 includes a plurality of image content generators 31, and each image content generator 31 includes an AV input processor 311 that receives an image transmitted from the image input unit 10, a control input processor 312 that receives a control signal transmitted from the controller 20, an application 313 selected from the AR, VR, XR, and MR heterogeneous applications, and a result processing and generation unit 314 that combines the actual image input through the AV input processor 311 and a virtual image generated by the application 313 according to the control signal of the control input processor 312 to generate an image content, synchronizes the image content and transmits the synchronized image content to the result output unit 40.

The present invention can provide a plurality of heterogeneous applications including AR, VR, XR, and MR in an integrated manner through a single platform based on the cloud according to a control signal of a user, and thus the user can receive a real-time streaming service of a plurality of heterogeneous applications including AR, VR, XR, and MR.

That is, the cloud platform 1 according to the present invention can provide choices with respect to high-quality AR, VR, XR, and MR applications or mobile content in the form of a menu through a terminal of a user, and the user can select a desired program and then immediately execute the program to be provided with an image content service in real time through his/her terminal without downloading and installing a large-capacity file.

4. Result Output Unit 40

The result output unit 40 receives the image content generated through the application program unit 30, converts the image content through compression, and then streams the compressed image content to the user terminal in real time through a streaming engine.

Figure 5:
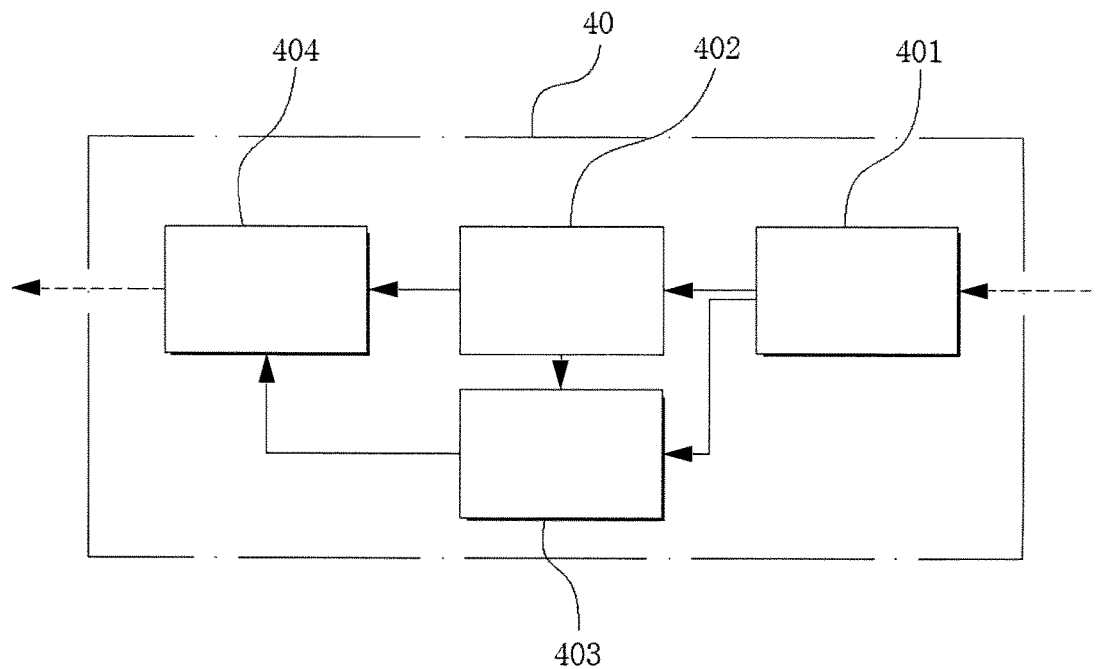
FIG. 5 is a configuration of a result output unit constituting the cloud platform according to the present invention.

As illustrated in FIG. 1, FIG. 5, and FIG. 6, the result output unit 40 includes an output receiver 401 that receives the image content generated through the application program unit 30, an AV compression converter 402 that compresses the image content received through the output receiver 410, and a streaming engine 404 that stably streams the image transmitted through the AV compression converter 402 to the user terminal.

Here, the result output unit 40 may further include a transmission packet converter 403.

The AV compression converter 402 may rapidly process an image through GPU based parallel processing, and image content rapidly processed in this manner is provided to the user terminal through real-time streaming using the streaming engine 404.

Since the image content provided through the streaming engine 404 is implemented based on the cloud and streamed in real time, the user can stream and experience graphics-intensive content in real time using an existing IPTV, mobile terminal, set-top box (STB), or a PC even when he/she does not have a terminal with advanced specifications.

5. Data Synchronization Processor 50

The data synchronization processor 50 is provided between the image input unit 10, the controller 20, the result output unit 40, and the application program unit 30, as illustrated in FIG. 1 and FIG. 6, and synchronizes data signals transmitted/received therebetween.

INDUSTRIAL APPLICABILITY

The cloud platform capable of providing a real-time streaming service for heterogeneous applications including AR, VR, XR, and MR according to the present invention based on the cloud can allow a user to easily execute and operate high-quality AR, VR, XR, and MR applications or mobile content through an IPTV, a mobile terminal, a set-top box, or a PC of the user without having a burden on data capacity and restraints on use according to heating and can allow service providers (Korea's mobile carriers such as KT, SKT, and LG Uplus, broadcasting companies, service providers that plan new services using new content, etc.) to construct a platform according to the present invention such that application programs developed by application developers can be directly used by users to remarkably reduce efforts and costs required to individually launch applications, and thus the present invention is industrially applicable.

The invention claimed is:

1. A cloud platform capable of providing a real-time streaming service for heterogeneous applications including augmented reality (AR), virtual reality (VR), extended reality (XR), and mixed reality (MR) irrespective of specifications of hardware of a user, the cloud platform comprising:
an image input processor configured to receive an image captured by a terminal of a user which is able to capture images, to process the received image through non-compression conversion, and to transmit the processed image to an application program processor;
a controller configured to receive control event data input through a control terminal of the user, to analyze the control event data, and to transmit a driving control signal to the application program processor;
wherein the application program processor is configured to select and execute one of the heterogeneous applications according to the driving control signal transmitted from the controller and to combine a virtual image realized by the selected application and the processed image transmitted from the image input processor to generate an image content;
a result output processor configured to receive the image content generated through the application program processor, to convert the image content through compression, and to stream the image content to an image terminal of the user which is able to reproduce images in real time through a streaming engine; and
a data synchronization processor configured to synchronize the image input processor, the controller, and the result output processor with the application program processor.

2. The cloud platform according to claim 1, wherein the image input processor includes:
an AV receiver configured to receive the image captured by the terminal of the user;
an AV non-compression converter configured to convert the image received through the AV receiver according to the non-compression conversion; and
a transmitter configured to transmit the image converted through the AV non-compression converter to the application program processor through the data synchronization processor.

3. The cloud platform according to claim 2, wherein the AV non-compression converter processes the received image according to graphics processing unit (GPU) based parallel processing.

4. The cloud platform according to claim 1, wherein the controller includes:
a control event receiver configured to receive a control event input through the control terminal of the user;
a data analyzer configured to analyze data of the control event received through the control event receiver; and
a transmitter configured to transmit the data analyzed through the data analyzer to the application program processor through the data synchronization processor.

5. The cloud platform according to claim 1, wherein the application program processor includes a plurality of image content generators,
wherein each image content generator includes:
an AV input processor configured to receive the image transmitted from the image input processor;
a control input processor configured to receive the driving control signal transmitted from the controller;
the application selected from the plurality of heterogeneous; and
a result processing and generation processor configured to combine the processed image input through the AV input processor and the virtual image generated by the application according to the control signal of the control input processor to generate the image content, to synchronize the image content, and to transmit the synchronized image content to the result output processor.

6. The cloud platform according to claim 1, wherein the result output processor includes:
an output receiver configured to receive the image content generated through the application program processor;
an AV compression converter configured to compress the image content received through the output receiver; and
a streaming engine configured to stream the image transmitted through the AV compression converter to the terminal of the user.

7. The cloud platform according to claim 6, wherein the result output processor further includes a transmission packet converter.

8. The cloud platform according to claim 6, wherein the AV compression converter processes the image content according to graphics processing unit (GPU) based parallel processing.

9. A cloud platform capable of providing a real-time streaming service for heterogeneous applications including augmented reality (AR), virtual reality (VR), extended reality (XR), and mixed reality (MR) irrespective of specifications of hardware of a user, the cloud platform comprising:
an image input processor configured to receive an image captured by a user, to process the received image through non-compression conversion, and to transmit the processed image to an application program processor;
a controller configured to receive control event data input through a control terminal of the user, to analyze the control event data, and to transmit a driving control signal to the application program processor;
wherein the application program processor includes a plurality of image content generators configured to select and execute one of the heterogeneous applications according to the driving control signal transmitted from the controller and to combine a virtual image realized by the selected application and the processed image transmitted from the image input processor to generate an image content, and wherein each image content generator includes: an AV input processor configured to receive the image transmitted from the image input processor; a control input processor configured to receive the driving control signal transmitted from the controller; the application selected from the plurality of heterogeneous applications; and a result processing and generation processor configured to combine the processed image input through the AV input processor and the virtual image generated by the application according to the driving control signal of the control input processor to generate the image content, to synchronize the image content, and to transmit the synchronized image content to a result output processor;

the result output processor configured to receive the image content generated through the application program processor, to convert the image content through compression, and to stream the image content to an image terminal of the user in real time through a streaming engine, and a data synchronization processor configured to synchronize the image input processor, the controller, and the result output processor with the application program processor.

10. A cloud platform capable of providing a real-time streaming service for heterogeneous applications including augmented reality (AR), virtual reality (VR), extended reality (XR), and mixed reality (MR) irrespective of specifications of hardware of a user, the cloud platform comprising:

an image input processor configured to receive an image captured by a user, to process the received image through non-compression conversion, and to transmit the processed image to an application program processor;

a controller configured to receive control event data input through a control terminal of the user, to analyze the control event data, and to transmit a driving control signal to the application program processor;

wherein the application program processor is configured to select and execute one of the heterogeneous applications according to the driving control signal transmitted from the controller and to combine a virtual image realized by the application and the processed image transmitted from the image input processor to generate an image content;

a result output processor configured to receive the image content generated through the application program processor, to convert the image content through compression, and to stream the image content to an image terminal of the user in real time through a streaming engine and including an output receiver configured to receive the image content generated through the application program processor, an AV compression converter configured to compress the image content received through the output receiver, and a streaming engine configured to stream the image content transmitted through the AV compression converter to a terminal of the user in real time; and a data synchronization processor configured to synchronize the image input processor, the controller, the result output processor with the application program processor.

\* \* \* \* \*